June 2, 1959 W. E. WHITE 2,889,015
AUTOMATIC BRAKE ADJUSTER
Filed Feb. 27, 1956 4 Sheets-Sheet 1

INVENTOR.
WILLIAM E. WHITE
BY
*J. Frederick Bechtel*
ATTY.

June 2, 1959

W. E. WHITE 2,889,015

AUTOMATIC BRAKE ADJUSTER

Filed Feb. 27, 1956

INVENTOR.
WILLIAM E. WHITE
BY
ATTY.

June 2, 1959  W. E. WHITE  2,889,015
AUTOMATIC BRAKE ADJUSTER
Filed Feb. 27, 1956  4 Sheets-Sheet 4

INVENTOR.
WILLIAM E. WHITE
BY
J. Frederick Bechtel
ATTY.

United States Patent Office 2,889,015
Patented June 2, 1959

2,889,015

AUTOMATIC BRAKE ADJUSTER

William E. White, Buchanan, Mich., assignor to Clark Equipment Company, a corporation of Michigan Application February 27, 1956, Serial No. 567,784

11 Claims. (Cl. 188—196)

This invention relates to improvements in brake equalizers and more particularly to means for automatically adjusting power actuated brakes.

In order that brakes may operate efficiently it is essential that a relatively small clearance be maintained between the brake lining and the brake drum. Heretofore, a variety of types of automatic brake adjusting mechanisms have been devised for maintaining this clearance constant throughout the life of the brake lining. However, the automatic brake adjusters heretofore devised have not provided any simple means for automatically indicating to the operator of the vehicle the fact that excessive wear of the lining has taken place and that it must be replaced. As a consequence brakes are often used until the rivet heads which attach the lining to the brake shoes are fully exposed, thereby allowing the rivet heads to score and groove the braking surface of the brake drum which necessitates machining thereof to remove the damaged portion. After a few such machining operations on the brake drum, the drum becomes unsafe for further use and must be replaced.

It is therefore a primary object of this invention to provide automatic brake adjusting means in which is provided an automatic safety device which does not permit brake adjusting to continue after a predetermined degree of brake lining wear has taken place.

It is another object of this invention to provide means for automatically adjusting brakes in such a manner that the amount of brake pedal depression during brake application is maintained substantially constant until a predetermined amount of brake lining wear has occured, following which brake pedal depression will increase in proportion to the amount of additional lining wear.

A further object is to provide a device which is simple in construction, economical to manufacture, and readily applicable to modern vehicle brake constructions.

Other objects and advantages will become apparent in view of the description which follows:

In carrying out my invention I have devised an automatic brake adjusting means in the nature of a friction clutch which is connected to the brake mechanism through a lost motion connection, the clearance between the brake shoe and brake drum being automatically and continuously maintained by the constant quantum of lost motion in said connection resulting from the operation of the friction clutch, which is designed to resist action of brake shoe return means following application of the brake, but which is inadequate to resist the force applied to the brake shoe by hydraulic cylinder means. As a result, a movable member of the friction clutch will be actuated to successively different positions in very small increments of movement during a plurality of brake applications so as to maintain the shoe clearance proportional to the constant lost motion in the above-mentioned connection. The friction clutch is designed in such a manner that it becomes ineffective to maintain said clearance following a predetermined degree of wear of the brake lining, following which the clearance between the shoe and drum increases with continued brake applications, it being reflected in an increasing brake pedal depression which warns the operator that the brake lining needs to be replaced.

In the drawings.

In the accompanying drawings like numerals are employed to designate like parts.

Figure 1:
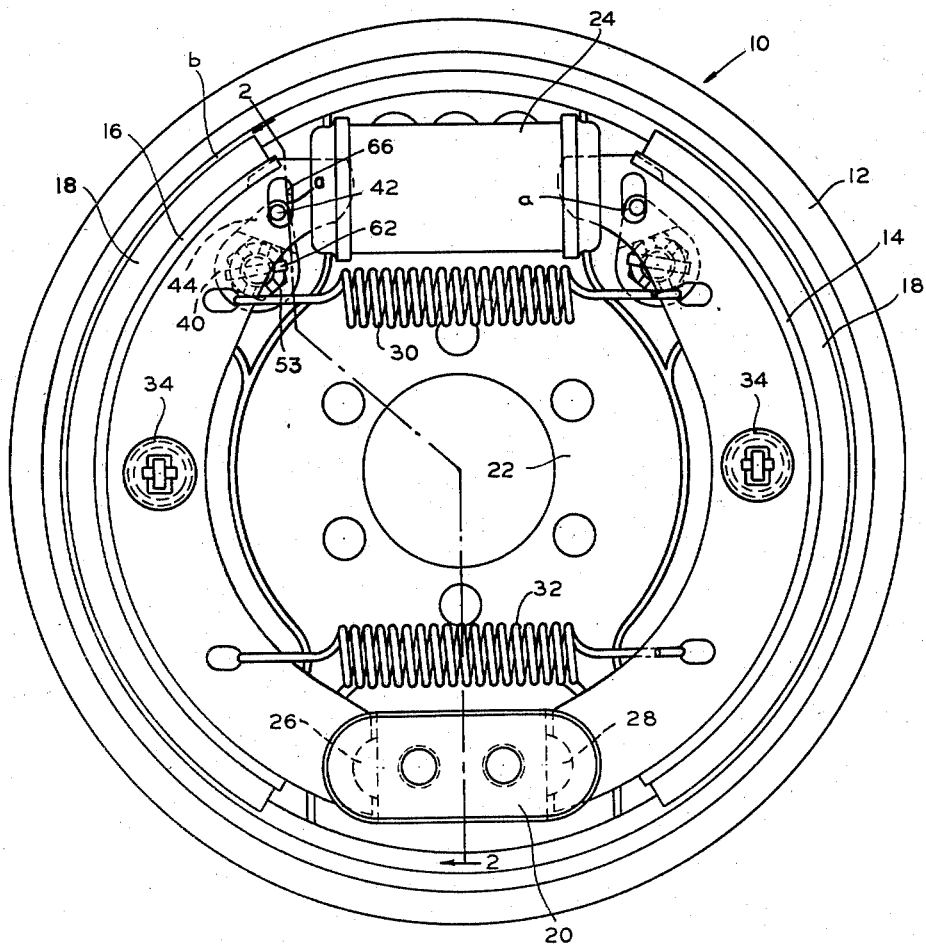
Figure 1 is a plan view of an hydraulic brake mechanism to which my invention has been applied.

Referring now to Figures 1 through 4, wherein for the purpose of illustration is shown a preferred embodiment of my invention, an assembled shoe type hydraulic brake mechanism is generally shown at numeral 10 and includes a brake drum 12 adapted to be mounted for rotation with a vehicle wheel, not shown, and a pair of brake shoes 14 and 16 each of which carries a brake lining 18 and each of which is pivotally supported on an anchor means 20 which is rigidly connected to a backing plate 22. The brake shoes are actuated at the upper ends thereof by pistons mounted within hydraulic cylinder 24 which are capable of traveling in opposite directions so as to actuate the shoes about abutment members 26 and 28 of the anchor means 20, whereby the brake linings 18 may be moved into braking engagement with the drum 12. A pair of shoe return springs 30 and 32 are connected in the usual manner between the webs of the brake shoes for returning said shoes to inoperative positions whenever hydraulic pressure in cylinder 24 is released. Spring loaded shoe retainers 34 having stems 36 extending through openings in the backing plate 22 are provided for maintaining a fixed transverse position of each shoe within the drum. The mechanism thus far described is used in some standard forms of brakes and forms no part of my invention.

In the description which follows only one automatic shoe adjuster in accordance with my invention will be described, although it will be understood that such an adjuster is utilized to cooperate with each shoe of a brake mechanism as described above and as shown in Figure 1.

A movable clutch element 40 having an outwardly projecting pin 42 of predetermined dimension integrally formed with an upper projecting portion 44 thereof and an annular shaped segmented surface 46 which is formed to provide alternate radially outwardly extending lugs and slots 48 and 50 of generally trapezoidal configuration, is secured to backing plate 22 by a bolt 52 and a castle nut 53. Projecting outwardly from the inner face of backing plate 22 and preferably formed integral therewith is an annular shaped element 54 having alternate lugs and slots 56 and 58 formed in the outer face thereof, the configuration of which is preferably the same as that of lugs and slots 48 and 50. When assembled the nut 53 abuts perpendicular surfaces 41 and 41a (see Fig. 4) of member 40, so that bolt 52 may be adjusted as desired without movement of nut 53. Located between the head of bolt 52 and backing plate 22 is a spring washer 60. Bolt 52 may be adjusted so as to tend to flatten washer 60 such that a predetermined force holds the discrete planar surfaces of lugs 48 and 56 in frictional engagement; at such an adjusted position a pin 62 may be inserted through the castle nut and a transverse opening in the bolt 52 to maintain the adjusted position thereof during operation of the brake mechanism.

Figure 2:
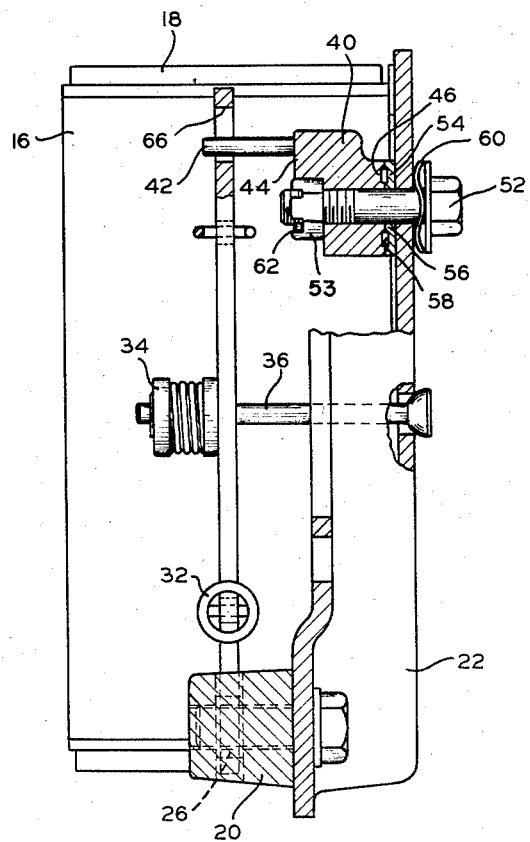
Figure 2 is a partial section of the brake mechanism shown in Figure 1 taken substantially along line 2—2 of Figure 1.
Figure 3:
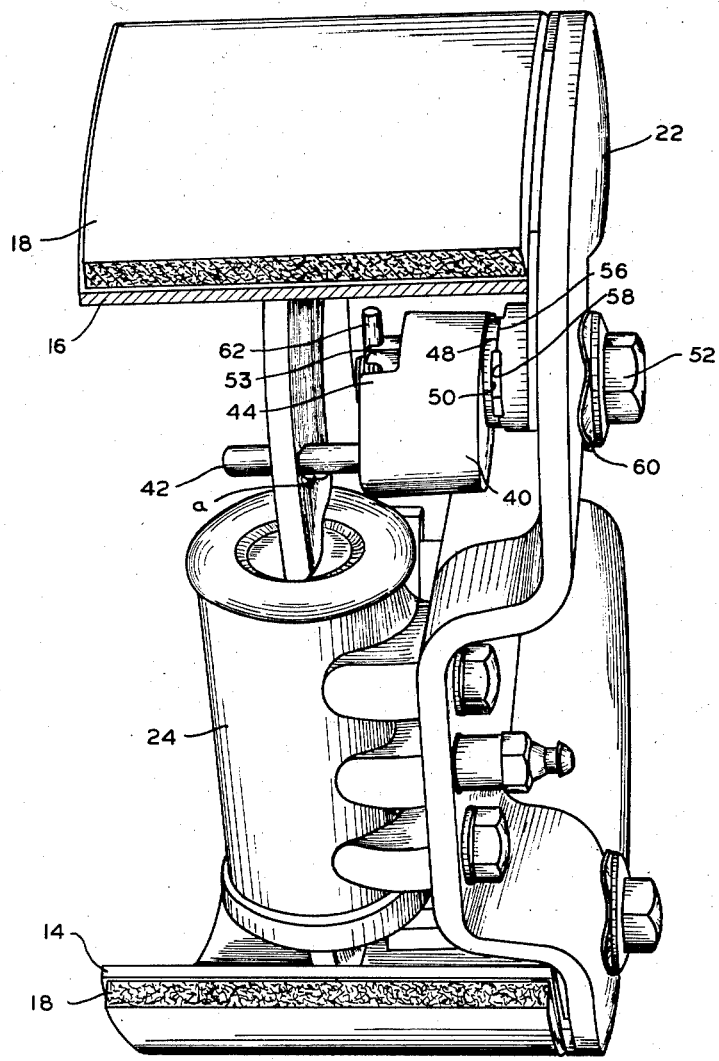
Figure 3 is a perspective of the brake mechanism shown in Figure 1 with the brake drum removed and showing the operating relation of the various parts of my automatic brake adjuster.
Figure 4:
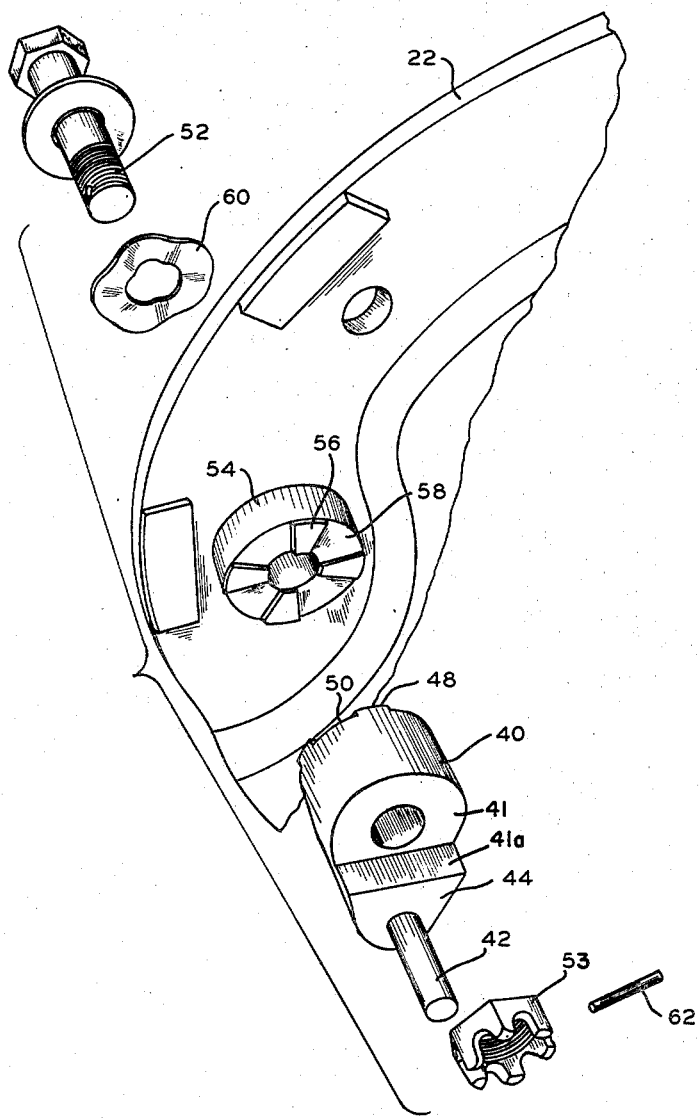
Figure 4 is a fragmentary perspective view of the backing plate of the brake mechanism and an exploded perspective view of the various parts of the brake adjuster.

When the brake adjuster is initially assembled with the brake mechanism and no brake lining wear has occurred, the projecting pin 42 extends through a slot 66 in the web of the brake shoe and the facing lugs 48 and 56 of member 40 and projection 54, respectively, are in full surface engagement with each other as shown in Figures 2 and 3. From an inspection of Figures 1 and 3 it will immediately be seen that the diameter of pin 42 is less than the width of slot 66, the difference in the said dimensions of the pin and slot being a predetermined amount which is in proportion to the clearance desired between the shoe and drum. It is a function of the automatic brake adjuster to maintain constant the shoe to drum clearance so long as the lugs 48 and 56 are maintained in abutment with each other. The above noted dimensional difference between the pin and slot is denoted by the letter $a$ and the clearance between the shoe and drum by the letter $b$.

The adjustment range of bolt 52 within which the brake adjuster is effective to compensate for wear of the lining is relatively large, since the bolt can be adjusted to any position at which the spring 60 causes a frictional or holding force to be produced between the facing lugs which is greater than the moment force produced by return springs 30 and 32. The actuating force of the brake pistons must always be greater than the maximum available torsional frictional force between the planar surfaces of lugs 48 and 56.

With the brake adjusting mechanism assembled in position as shown in the drawings, energization of cylinder means 24 results in engagement between the brake lining and drum at the moment when the right side (in Fig. 1) of slot 66 first contacts the adjacent side of pin 42 after transversing clearance $a$. Release of the brake permits the return springs 30 and 32 to return the brake shoe 16 to the position shown in Figure 1. At this time, assuming that no lining wear has occurred, the position of clutch member 40 is the same as it was prior to application of the brake, inasmuch as the brake return springs cannot overcome the frictional force between lugs 48 and 56. It will be apparent that in this condition a substantially zero force is exerted against pin 42 by the adjacent or left side of slot 66 since brake clearance $b$ and lost motion clearance $a$ are proportional.

As the lining 18 begins to wear following repeated applications of the brake, clearance $b$ increases and cylinder means 24 must actuate the shoe 16 a greater distance than clearance $a$ to cause engagement of the brake. In so doing, the inner side of slot 66 contacts pin 42 and causes member 40, bolt 52, and nut 53 to rotate until lining 18 contacts the brake drum, thereby establishing a new position of member 40 and reestablishing clearance $a$ proportional to clearance $b$ until the next increment of brake lining wear permits further actuation of the shoe to again cause member 40 to rotate a slight additional degree. Thus, the adjuster member 40 and pin 42 move toward the brake drum in extremely small increments as the lining wears, and since the brake return springs are unable to overcome the frictional force tending to hold the adjusted position of member 40 and pin 42, lost motion clearance $a$ is maintained proportional to brake clearance $b$. In this manner the brake is automatically adjusted and a substantially constant degree of brake pedal depression is maintained.

As wear compensating movement of the adjuster member 40 progresses, the lugs 48 are, of course, gradually moved out of surface engagement with the corresponding facing lugs 56 on projection 54. When the wear of the brake lining has progressed a predetermined extent, the lugs 48 are actuated completely out of engagement with lugs 56 and drop into the slots 58 as lugs 56 drop into the slots 50. This condition may occur, for example, after member 40 has been rotated about 30 degrees.

It will now be seen that no further brake adjusting action can occur since the adjusted compressive force output of spring washer 60 is relieved as the lugs of members 40 and 54 register with corresponding slots therein; the resulting total frictional force between the lugs and slots in registry approaches zero and is substantially less than the force exerted by the return springs 30 and 32. As a result, the pin 42 will continue to be returned after each brake application to its last adjusted position by springs 30 and 32, in which position adjacent edges of the lugs 48 and 56 are in abutment; as lining wear continues to progress, each brake application will result in greater rotational movement of the lugs 48 in slots 58 and brake clearance $b$ will increase beyond its optimum clearance value.

The lugs 48 and 56 are preferably formed on members 40 and 54, respectively, so that the angles subtended by the intermediate slots 50 and 58 are substantially equal to each other and are each sufficiently greater than the angle subtended by each of the lugs that each lug is free to move in its corresponding slot without interference with the next adjacent lug on the other member. This arrangement obviously permits continued use of the worn brake lining after full automatic brake adjustment, but at the same time warns the operator of his need for relining as continued use causes a gradual increase in the pedal depression which is necessary to apply the brake.

From the above it will be seen that I have devised a brake adjusting mechanism which permits the brake shoe to move toward the brake drum any desired distance while preventing return movement thereof further than a predetermined distance until such time as lining wear has progressed to the point where it is no longer desirable to provide further automatic adjustment, following which the brake operates as though no automatic adjuster has been provided therefor.

It will be understood that the form of my invention as disclosed herein is but a preferred example of the same. Variations in design and in size of parts, and in shape and arrangement thereof will be apparent to those skilled in the art, and I intend that I be not limited otherwise than by the scope of the appended claims.

I claim:

1. For use in a brake mechanism having a brake drum, a brake supporting plate, and a movable brake shoe supported on said plate including a friction lining connected to one face thereof, automatic shoe adjusting means adapted to be connected between the brake shoe and the support plate comprising a pair of relatively movable members each having a discrete planar surface comprising a plurality of discontinuous portions, the discrete planar surface of one of said members being normally in torsional friction clutching relation to the discrete planar surface of the other of said members and being actuatable in one direction during such clutching relation and adapted to maintain a substantially constant clearance between the drum and shoe irrespective of progressive wear of the brake shoe friction lining, and said one member being also adapted to be actuatable out of said friction clutching relation following a predetermined amount of wear of the friction lining of said shoe.

2. For use in a brake mechanism having a brake drum, a brake supporting plate, and a movable brake shoe supported on said plate, automatic shoe adjusting means comprising a first member adapted to be mounted on said support plate having a discrete planar surface comprising a plurality of discontinuous portions, and a second member having a discrete planar surface comprising a plurailty of discontinuous portions normally in torsional frictional engagement with the discrete planar surface of said first member and adapted to be connected to the brake shoe, and means for actuating said second member out of said frictionally engaging contact with said first member following a predetermined quantum of movement of said second member relative to said first member.

3. For use in a brake having a rotatable brake drum, a brake support plate, a movable brake shoe supported on said plate, first means for urging the brake shoe in a drum engaging direction, and second means for urging the brake shoe in a drum disengaging direction, automatic brake shoe adjusting means adapted for maintaining a fixed clearance between the shoe and drum throughout a predetermined quantum of adjustment of the shoe and for permitting said clearance to increase following said predetermined quantum of adjustment comprising a fixed member adopted to be mounted on the support plate and having a plurality of outwardly facing raised surfaces thereon, a movable member having a plurality of correspondingly raised surfaces thereon, means for normally securing frictional engagement between the raised surfaces of each of said members, and means adapted to operatively connect said movable member to said shoe and to the first urging means, said movable member being adapted to be adjustably actuated by the first urging means in a manner such that the raised surfaces thereof are disengaged from the raised surfaces of said fixed member following a predetermined quantum of movement of said movable member.

4. A mechanism as claimed in claim 3 wherein said securing means includes resilient means for adjusting the frictional force between contiguous raised surfaces, said resilient means becoming relaxed upon disengagement of said raised surfaces.

5. A mechanism as claimed in claim 3 wherein the corresponding raised surfaces of each of said members form corresponding slots therebetween, and the raised surfaces of said movable member are actuatable into the slots of said fixed member by said securing means following a predetermined quantum of adjusting movement of said movable member.

6. A mechanism as claimed in claim 4 wherein the force of friction is adjustable by said resilient means such that the movable member is adapted to be actuated by the first urging means to adjust the shoe in a drum engaging direction but at the same time is adapted to effectively resist actuation in a drum disengaging direction by the second urging means prior to disengagement of said raised surfaces.

7. A mechanism as claimed in claim 6 wherein following adjustment of said movable member to a surface disengaging position, said movable member is ineffective to resist the action of said second urging means in the extreme range of movement thereof beyond the position at which surface disengagement occurs, whereby continued use of the brake results in an increasing clearance between the shoe and drum.

8. For use with a brake having a rotatable brake drum, a brake supporting member and a brake shoe supported by said member and adapted to be alternately engaged with and disengaged from the brake drum, automatic brake shoe adjusting means comprising a fixed member adapted to be mounted on the supporting member and having gear-like tooth members formed in one face thereof, an adjusting member having corresponding gear-like tooth members formed in one face thereof which are normally secured in non-meshing frictional engagement with the first mentioned tooth members, and lost motion means adaptable for connecting said movable member to the shoe, said frictionally engaged tooth members adaptable for adjustment toward meshing relation during movement of said brake shoe in a drum engaging direction.

9. A mechanism as claimed in claim 8 wherein means are provided for adjusting the force of friction between said tooth members, said latter means becoming ineffective following actuation of said tooth members into meshing relation.

10. A mechanism as claimed in claim 8 wherein a means is provided which is adaptable for urging the brake shoe in a drum disengaging direction and is operatively connected to said movable member through said lost motion means, said latter means being effectively resisted by said movable member when the tooth members thereof are in frictional engagement with the corresponding tooth members of said fixed member and being ineffectively resisted by said movable member when the tooth members thereof are in meshing relation with the corresponding tooth members of said fixed member.

11. Automatic adjusting means for a shoe of an internal expanding brake assembly of the character described comprising a fixed member having a plurality of projections extending therefrom, said projections having outer surfaces thereon which are coplanar and form a first discrete planar surface comprised of a plurality of discontinuous plane portions, a movable member adapted to be operatively connected to the shoe and having a plurality of projections extending therefrom, the last-named projections having outer surfaces thereon which are coplanar and form a second discrete planar surface comprised of a plurality of discontinuous plane portions, the said second discrete planar surface normally being contiguous to the said first discrete planar surface, and means normally maintaining the said discrete planar surfaces in frictional engagement for effectively resisting movement of said movable member in one direction and for ineffectively resisting movement thereof in the opposite direction, the discrete planar surface of said movable member being actuatable therewith in said opposite direction out of frictional engagement with the discrete planar surface of the said fixed member following a predetermnied quantum of movement of said movable member.

References Cited in the file of this patent

UNITED STATES PATENTS

| | | |
|---|---|---|
| 1,853,906 | Kohr | Apr. 12, 1932 |
| 2,018,567 | Page | Oct. 22, 1935 |
| 2,030,848 | Boughton et al. | Feb. 18, 1936 |
| 2,670,058 | Landrum | Feb. 23, 1954 |
| 2,736,396 | Rasmussen et al. | Feb. 28, 1956 |
| 2,775,321 | Phillips | Dec. 25, 1956 |

FOREIGN PATENTS

| | | |
|---|---|---|
| 914,198 | France | June 17, 1946 |
| 885,631 | Germany | Aug. 6, 1953 |

UNITED STATES PATENT OFFICE
CERTIFICATE OF CORRECTION

Patent No. 2,889,015

June 2, 1959

William E. White

It is hereby certified that error appears in the printed specification of the above numbered patent requiring correction and that the said Letters Patent should read as corrected below.

Column 1, line 39, for "adjusting" read -- adjustment --; column 4, line 36, for "has" read -- had --; column 5, line 13, for "adopted" read -- adapted --.

Signed and sealed this 6th day of October 1959.

(SEAL)
Attest:

KARL H. AXLINE
Attesting Officer

ROBERT C. WATSON
Commissioner of Patents